United States Patent [19]

Liu

[11] Patent Number: 5,018,063
[45] Date of Patent: May 21, 1991

[54] METHOD FOR REDUCING CROSS-INTERROGATE DELAYS IN A MULTIPROCESSOR SYSTEM

[75] Inventor: Lishing Liu, Pleasantville, N.Y.

[73] Assignee: International Business Machines Corporation, Armonk, N.Y.

[21] Appl. No.: 280,034

[22] Filed: Dec. 5, 1988

[51] Int. Cl.⁵ .................. G06F 12/00; G06F 12/08; G06F 12/14

[52] U.S. Cl. .................. 364/200; 364/229; 364/243; 364/243.4; 364/243.41; 364/246.6; 364/246.8; 364/252.3; 364/255.1; 364/256.3; 364/259.2; 364/259.3

[58] Field of Search ... 364/200 MS File, 900 MS File, 364/200, 900

[56] References Cited

U.S. PATENT DOCUMENTS

| | | | |
|---|---|---|---|
| 4,208,716 | 6/1980 | Porter et al. | 364/200 |
| 4,345,309 | 8/1982 | Arulpragasam et al. | 364/200 |
| 4,349,871 | 9/1982 | Lary | 364/200 |
| 4,414,624 | 11/1983 | Summer, Jr. et al. | 364/200 |
| 4,439,829 | 3/1984 | Tsiang | 364/200 |
| 4,471,429 | 9/1984 | Porter et al. | 364/200 |
| 4,481,573 | 11/1984 | Fukunaga et al. | 364/200 |
| 4,686,621 | 8/1987 | Keeley et al. | 364/200 |
| 4,727,486 | 2/1988 | Smith et al. | 364/200 |
| 4,831,622 | 5/1989 | Porter et al. | 364/200 |
| 4,833,601 | 5/1989 | Barlow et al. | 364/200 |
| 4,845,614 | 7/1989 | Hanawa et al. | 364/200 |
| 4,875,155 | 10/1989 | Iskiyan et al. | 364/200 |

Primary Examiner—James W. Moffitt
Assistant Examiner—George C. Pappas
Attorney, Agent, or Firm—Terry J. Ilardi; Ronald L. Drumheller

[57] ABSTRACT

A Fetch-Then-Confirm (FTC) policy is used for the handling of data fetch upon XIEX's in a tightly coupled multiprocessor environment. The fetch and/or use of a requested data line upon XIEX is allowed before the SCE receives the confirmation of validity (or invalidity) of the requested line through the clearing procedure. Whenever a line having uncertain validity is used by a CP the results of execution of instructions depending on the validity of the line should not be committed to the cache until a confirmation is received from the SCE. When the confirmation from the SCE indicates that a line L is known to be valid, all results depending on the validity of L can be processed as usual. If, however, the SCE indicates that a previously fetched line L having uncertain validity is in fact invalid, all operations performed based on L's contents should be aborted and restarted properly when a valid copy of L is received.

7 Claims, 17 Drawing Sheets

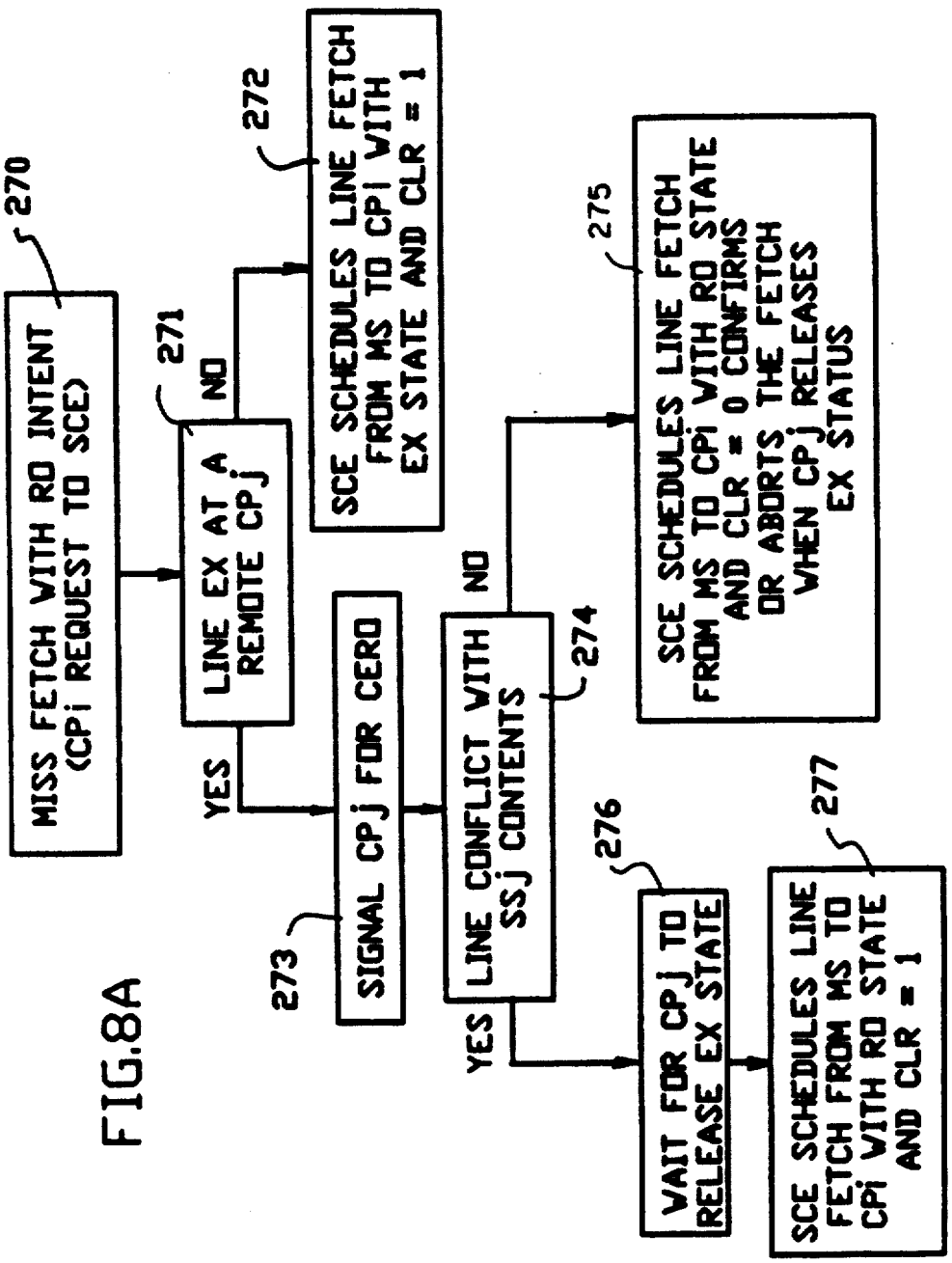

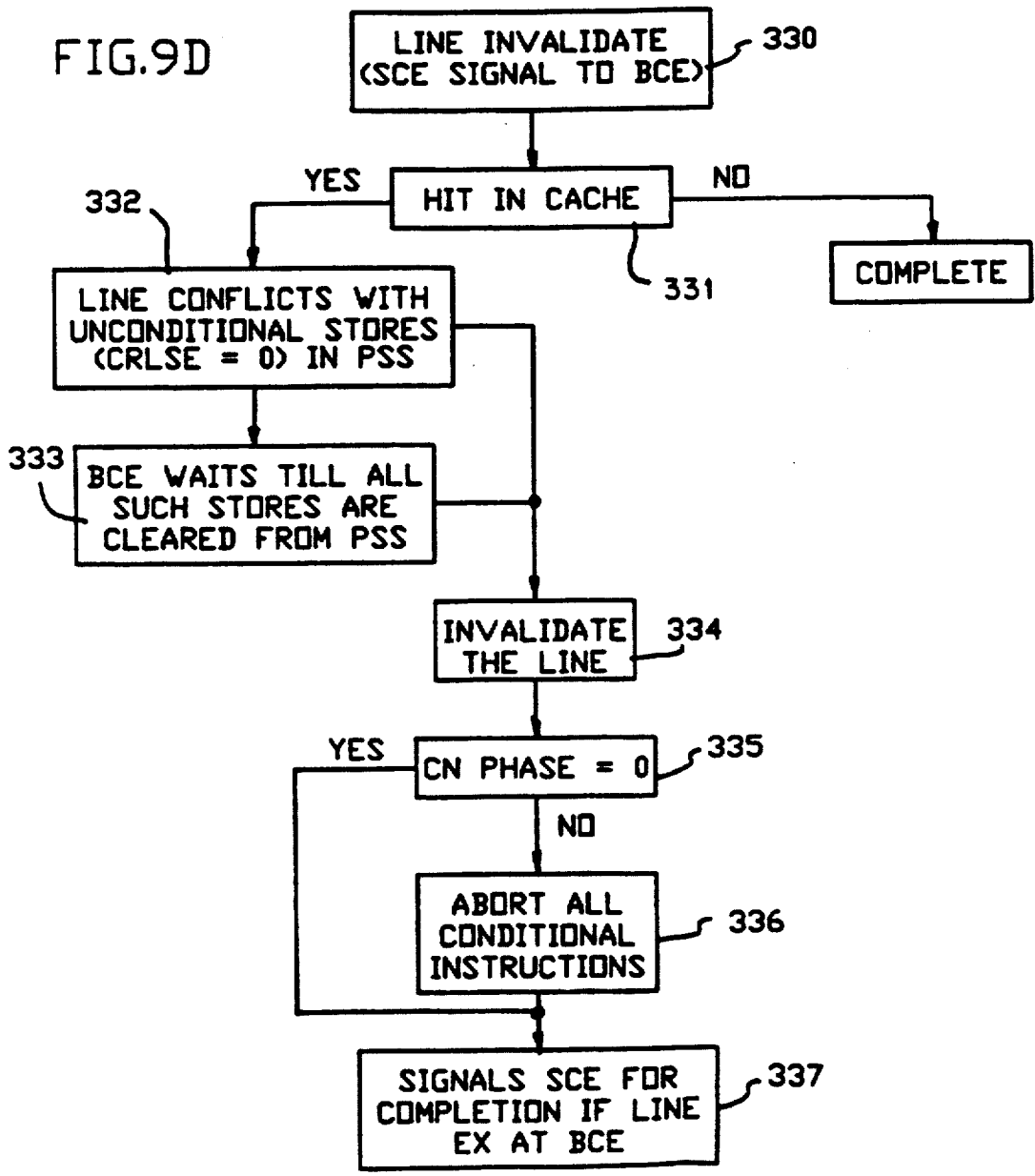

5,018,063

METHOD FOR REDUCING CROSS-INTERROGATE DELAYS IN A MULTIPROCESSOR SYSTEM

BACKGROUND OF THE INVENTION

I. Field of the Invention

The invention relates generally to caches in a multiprocessor environment and more particularly to a method for fetching lines of data from a cache that are potentially dirty.

II. Description of the Prior Art

Modern high performance stored program digital computers conventionally fetch instructions and data from main memory and store the fetched instructions and data in a cache memory. A cache is a local memory that is typically much smaller and much faster than the main memory of the computer. Virtually all high performance digital computers use a cache and even some commercially available microprocessors have local caches.

Caches were developed because it has not been possible to build extremely large memories at a reasonable cost that operate having an access time commensurate with modern day pipelined processors. It is, however, possible to build less expensive, small memories that can keep up with the processor. Since an instruction and its needed data in the cache can be immediately accessed by the processor, caches usually speed up computer performance.

Normally a processor (CP) accesses main storage (MS) data through its cache. A cache is usually organized as a 2-dimensional array, in which each array entry contains a fixed size block of MS data called a line. The directory of a cache describes the addressing information for its lines. When an access of instruction or data from the CP is located in the cache via directory lookup the access is said to hit the cache. Otherwise we say that the access misses in the cache. Upon a cache miss the cache control will generate a request to move the requested line into the cache. When a line is inserted into the cache it may replace an existing line. A cache is normally managed with certain replacement strategies such as the well known Least-Recently-Used (LRU) replacement algorithm. Depending on the cache design, the replacement of a line from cache may require update of the replaced contents to MS in order to maintain consistency of the storage.

Caches can be used in both multiprocessor and uniprocessor systems. In the type of multiprocessor (MP) system known as the tightly coupled multiprocessor system in which several CPs have their own caches that share a common operating system and memory, there are additional problems since it is necessary for each processor's cache to know what has happened to lines that may be in several caches simultaneously. In a multiprocessor system where there are many CPs sharing the same main storage, each CP is required to obtain the most recently updated version of data according to architecture specifications when access is issued. This requirement necessitates constant monitoring of data consistency among caches, often known as the cache coherence problem.

There are various types of caches in prior art multiprocessor systems. One type of cache is the store through (ST) cache as described in U.S. Pat. No. 4,142,234 for IBM System/370 Model 3033 MP. ST cache design does not interfere with the CP storing data directly to the main storage (or second level cache) in order to always update changes of data to main storage. Upon the update of a store through to main storage appropriate cross invalidate actions may take place to invalidate possible remote copies of the stored cache line. The storage control element (SCE) maintains proper store stacks to queue the MS store requests and standard communications between buffer control element (BCE) and SCE will avoid store stack overflow conditions. When the SCE store stack becomes full the associated BCE will hold its MS stores till the condition is cleared.

Another type of cache design is the store-in cache (SIC). SICs are described in U.S. Pat. Nos. 3,735,360 to Anderson et al. and 3,771,137 to Warner et al. A SIC cache directory is described in detail in U.S. Pat. No. 4,394,731 to Flusche et al. in which each line in a store-in cache has its multiprocessor shareability controlled by an exclusive/read only (EX/RO) flag bit. The main difference between ST and SIC caches is that, all stores in SIC are directed to the cache itself (which may cause a cache miss if the stored line is not in the SIC cache). It is also proposed in U.S. Pat. No. 4,503,497 that data transfers upon a miss fetch can take place through a cache to cache transfer bus (CTC) if a copy is in the remote cache. A SCE is used that contains copies of the directories in each cache. This permits cross interrogate (XI) decisions to be resolved at the SCE. Usually cache line modifications are updated to main storage only when the lines are replaced from the cache.

A cache line that is RO is valid only in a read only state. The processor can only fetch from the line. Stores into the line are prohibited. A RO cache line may be shared simultaneously among different caches.

A cache line that is EX is valid but only appears in the cache of one processor. It is not resident in any other (remote) cache. Only the (owning) processor is allowed to store into the line.

A cache line that is CH indicates that not only is the line valid and EX but that it has been stored into. That is the copy in main storage may not be up to date. When a CH line is replaced a copy is sent to main storage via a castout action.

An INV cache line is a line that is invalid.

In a typical computer system a first CP, $P_1$, may access an instruction or data from a line in a cache. Its own cache will be checked and if the particular line requested is read only (RO) it may make a store request, and via the storage control element (SCE), make that line exclusive (EX). Once the line is made exclusive, the storage control element (SCE) indicates to the other caches that the line is invalid and the first cache will be free to write into that line.

In the multiprocessor cache environment a problem known as the Cross-Interrogate (XI) problem occurs as a result of relatively close accesses of the same data line by different processors (CP's). For instance, if a line is modified by CP $P_1$ other CP's may fetch a dirty copy of a line L if line L is fetched from memory before the modifications by $P_1$ are updated to the memory.

It becomes increasingly difficult to handle the XI problem efficiently as more CP's are added to a the system. For illustration purposes, in the following consider a multiprocessor system in which there are N CP's $\{P_i | 1 \leq i \leq N\}$ and a private cache $C_i$ for each $P_i$. For purposes of the present discussion a memory hierarchy in which shared main memory is the one below private caches is assumed.

One major problem with ST cache design is the traffic generated by all CPs in the system. However, a trend in future MP systems is the availability of high performance shared storage among all processors. An example of such fast shared storage is the shared second level cache (L2). With the provision of such high performance shared storage it becomes attractive to implement MP systems with ST caches while still support more CPs. Yet another problem with ST design is the busy store handshaking with SCE as illustrated in U.S. Pat. No. 4,142,234. In such design the data item being stored by a CP cannot be fetched by the same CP till the CP receives acknowledgement of the store from the SCE. Such busy handshake not only slows down the processor pipeline operation but also makes it difficult for the SCE to efficiently serialize all the stores when there are more CPs.

One known approach to the busy store handshake problem for ST design is to employ the EX/RO states from SIC design. Consider a store-thru cache MP environment in which at any moment, a cache line may have any one of the three states INV, RO or EX. INV indicates invalidity. RO indicates the possibility of simultaneous access of different copies of the line from more than one CP. EX guarantees that no other cache can have a copy of the line for access. A typical implementation of this multiprocessor cache scheme is as follows. Upon the fetch of a line L the line is brought into the cache with either RO or EX state (depending on the particular instance and the particular cache scheme). When, however, a store is requested on a line, the system should guarantee the EX state to the line before the line can be stored into. This granting of the EX state may involve XI actions to invalidate copies of the line from other caches. When a CP, for example, $P_2$, has a line L held EX in its cache and $P_1$ wants to access L, the Storage Control Element (SCE) ensures that $P_1$ is allowed to fetch L into its cache. Processes included between the time the SCE signals $P_2$ to give up EX state on L and the point when the SCE receives the signal that $P_2$ has given up the EX state with all pending stores updated to memory is called a clearing procedure. The purpose of a clearing procedure is to have the XI target CP give up its EX control of the line and to get any possible uncaptured stores to the line updated to the memory. The above described XI-hit to Remote EX (XIEX), however, causes heavy performance penalties, which especially increase as XI frequencies get higher with more CP's, due to the delay by clearing procedures.

From workload analysis it has been observed that when XIEX occurs it is very rare for the remote CP (owning the line L) to generate a store in a small time interval around the XIEX event. Most of the modifications on shared lines tend to occur over tens of references away from the actual ping pong point. As a result, upon an XIEX activity, the copy of the line in the fast shared storage is most likely to be valid for the requesting CP to use even before the clearing process is done. As a result, in such environment, heavy penalties from the clearing procedures for an XIEX are mostly unnecessary and unproductive.

Another known technique in modern processor design is conditional instruction execution based on branch prediction. With such design instruction streams may be fetched for decode and execution based on prediction of branch instruction outcome. In case instructions are initiated incorrectly based on wrong prediction they can be aborted later. Prior to the confirmation of an instruction, any store request resulted from the conditional execution will be held in a Pending Store Stack (PSS) for final release upon finish. Both instruction finishes and pending store releases are done in the order of architectural sequence, although instructions may be executed out of incoming sequence prior to completion. When a conditional instruction stream is aborted all the relevant instruction queue and pending stores in PSS are reset properly. There is no known art that allows instructions be executed conditionally based on storage data that is possibly invalid due to cache coherence reasons.

There is no known art directed to minimizing the delays caused by XIEX through anticipatory data access. All known methods of MP cache design allow a CP to access a cache line only when the line has already being cleared for architecture consistency. Upon XIEX situation the requesting CP can only access the cache line only when the remote CP holding the EX state on the line has released it EX control and then allow the line to be fetched to the requesting CP cache.

SUMMARY OF THE INVENTION

In accordance with a preferred but nonetheless illustrative embodiment demonstrating objects and features of the present invention there is provided a capability to let a CP access a cache line upon XIEX condition even before the clearing procedure is complete. As a result, in relatively few occasions, a line accessed by a CP upon XIEX situation may turn out to be dirty and cause proper instructions to be restarted. This has significant advantages on performance since it avoids most of the heavy penalties associated with the clearing procedure for XIEX handling.

The present invention provides a method of Fetch-Then-Confirm (FTC) for the handling of data fetch upon XIEX's. The invention utilizes an MP system with ST cache design and SIC type cache coherence management with EX/RO states. A relatively fast MS or shared L2 is assumed. The fetch and/or use of a requested data line upon XIEX is allowed before the SCE receives the confirmation of validity (or invalidity) of the requested line through the clearing procedure. Whenever a line having uncertain validity is used by a CP the results of execution of the instructions depending on the validity of the line should not be committed to the outside (e.g., the cache) until a confirmation is received from SCE. When the confirmation from the SCE indicates that a line L is known to be valid, all results depending on the validity of L can be finished as usual. If, however, the SCE indicates that a line having uncertain validity L previously fetched is in fact invalid, all operations performed based on L's contents should be aborted and restarted properly.

Hence, with the FTC policy, whenever an XIEX situation is detected by the SCE, it lets the requesting CP start fetching a copy of the line from memory, and at the same time sends a signal to the XI target CP for the clearing procedure. In such a situation the requesting CP should recognize that the fetched line is one whose validity has not yet been confirmed and therefore may not be valid and should be expecting confirmation from the SCE. The SCE should also remember the situation and wait for the results of the clearing procedure in order to later provide the requesting CP proper confirmation.

Accordingly it is an object of the invention to provide a method for early fetching cache lines to overcome the XI-problem;

It is another object of the invention to avoid unnecessary delays in the execution of instructions;

It is still another object of the invention to allow cache lines to be used prior to the determination of their validity.

These, and other, objects, advantages, and features of the invention will be more apparent upon reference to the description and the appended drawings.

BRIEF DESCRIPTION OF THE DRAWINGS

FIGS. 8A, 8B and 8C are flowcharts useful in explaining the operation of the present invention;

FIGS. 9A, 9B, 9C, and 9D are flowcharts useful in explaining the operation of the present invention;

DESCRIPTION OF THE PREFERRED EMBODIMENTS

Figure 1:
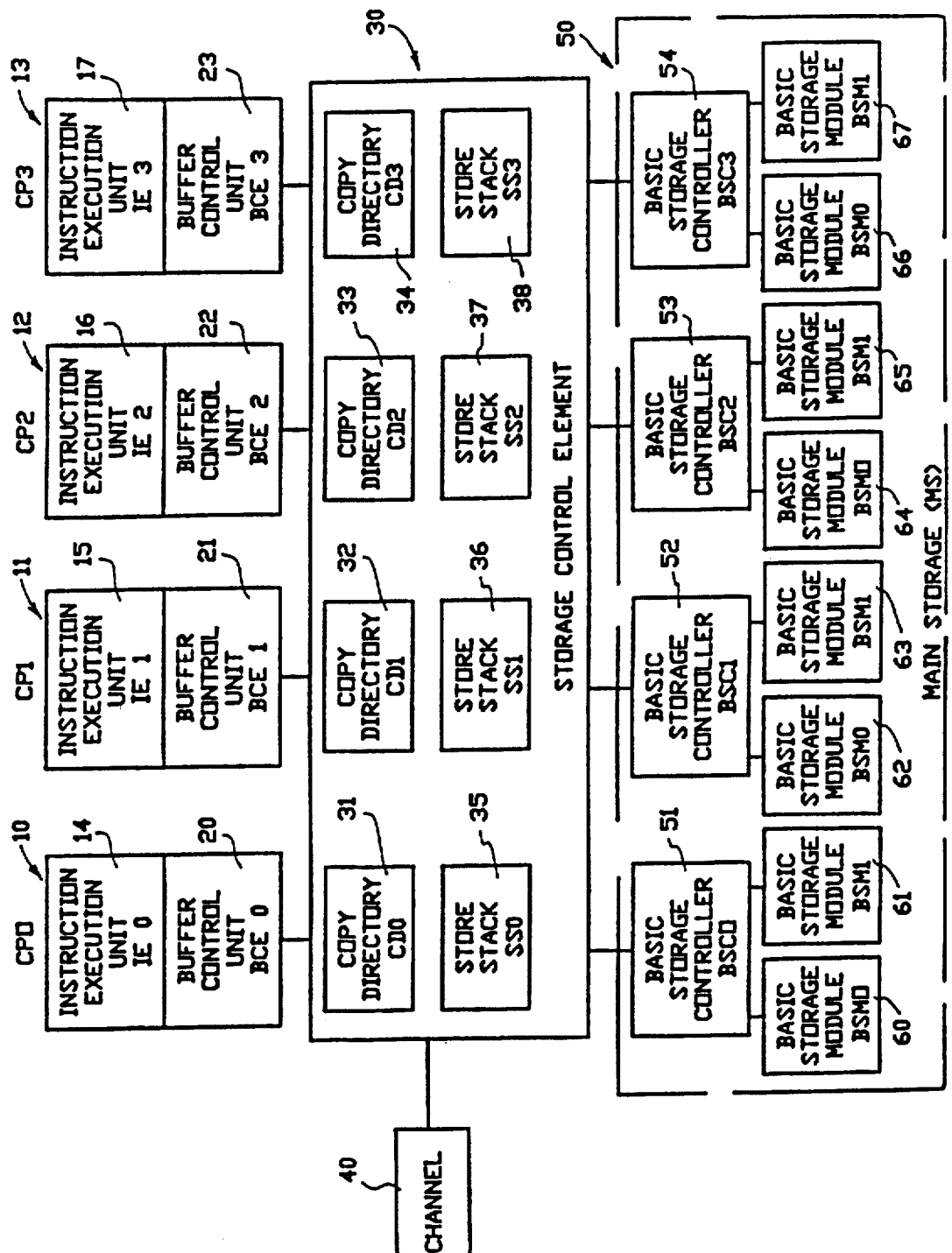
FIG. 1 shows a multiprocessing system in which the present invention may be used.

FIG. 1 represents a multiprocessing (MP) system in which the present invention may be used. The MP comprises four central processors (CP's) CP0 through CP3 (10, 11, 12 and 13), in which each CP includes an instruction execution (IE) unit (14, 15, 16 and 17, and a buffer control unit (BCE) 20, 21, 22 and 23, respectively. Each IE includes hardware and microcode that issue instructions that require the fetching and storing of operands in main storage (MS) 50.

The IE (14-17) begins a fetching or storing operation by issuing a fetch or store command to its respective cache controls (BCE) 20-23, which include a processor store-thru (ST) cache with its associated processor cache directory (PD) and all processor cache controls which are exclusively used by the associated CP (10-13). The CP generally issues a fetch or store command for each doubleword (DW) unit required by an operand. If the cache line containing the DW is in the PD, which is a cache hit situation, the DW is fetched or stored in the cache in accordance with the command. For an operand fetch hit in cache, the storage access is completed without any need to go outside of the BCE. Occasionally the required DW is not in the cache, which results in a cache miss.

Before the IE fetch or store command can be completed, the DW must be fetched from the main storage. To do this, the BCE generates a corresponding fetch or store miss command which requests the storage control element (SCE) 30 to obtain from main storage 50 a line unit of data having the DW required by the IE. The line unit will be located in the main storage 50 on a line boundary, but the required DW will be the first DW in the fetched line to be returned to the requesting BCE (20-23) in order to keep the IE request going before the completion of the missed line transfer.

SCE 30 connects to the CPs 10-13 and main storage 50. Main storage 50 is comprised of a plurality of basic storage module (BSM) controllers BSC0 thru BSC3 (51, 52, 53 and 54, respectively) in which each basic storage controller (BSC) 51-54 connects to two BSMs 0(60, 62, 64 and 66) and 1 (61, 63, 65, and 67). The four BSCs 0-3 (51-54) are each connected to SCE 30.

SCE 30 contains four copy directories (CDs) 31, 32, 33, and 34. Each CD contains an image of the contents of a corresponding processor cache directory (PD) in one of the BCEs in a manner similar to that described in Flusche et al, U.S. Pat. No. 4,394,731. Both PD and CD are addressed by the same bit positions from the logical address. The CDs handle all cross-interrogate (XI) requests and can thereby better service their respective CPs. A doubleword wide bidirectional data bus is provided between each BSM 60-67 in main storage and each SCE port, and from each SCE 30 to each CP and I/0 channel controller processor 40. Along with the data busses there are also separate sets of command bus for control and address signals. When a CP encounters cache miss for a DW access request, its BCE 20-23 initiates a line access request to main storage by sending a miss command to SCE 30, which then reissues the command to a required BSM 60-67 in main storage. In the event of a BSM busy condition, SCE 30 will save the request in a command queue and will reissue it at a later time when the required BSM 60-67 becomes available. SCE 30 also sequences the main storage commands in an orderly fashion so that all commands to a particular BSM are issued in first-in-first-out (FIFO) order, except when a cache conflict is found by its XI logic. During the normal sequence of handling a main storage request, SCE 30 constantly monitors the status of main storage, analyzes the interrogation results of protection key and all cache directories, examines updated status of all pending commands currently being held in SCE 30, and also looks for any new BCE commands that may be waiting in BCE 20-23 to be received by SCE 30.

SCE 30 maintains a plurality of store stacks SS0 through SS3 (35-38), each for the holding of main storage store requests of up to 16 DWs for a corresponding CP. SCE 30 keeps enough directory information for the store stacks for the indication of main storage addresses and validity. When a store stack risks overflow SCE 30 sends a priority request to the associated BCE 20-23 to hold the sending of more store requests till the BCE 20-23 receives a later signal from SCE 30 clearing the store stack full condition. Data in the store stacks are updated to main storage with appropriate scheduling maintaining the incoming order within each store stack. A line fetch request from a CP is held by SCE 30 till the SCE makes sure that all existing stores to the line in the store 10 stacks have been sent to the associated BSM 60-67.

Figure 2:
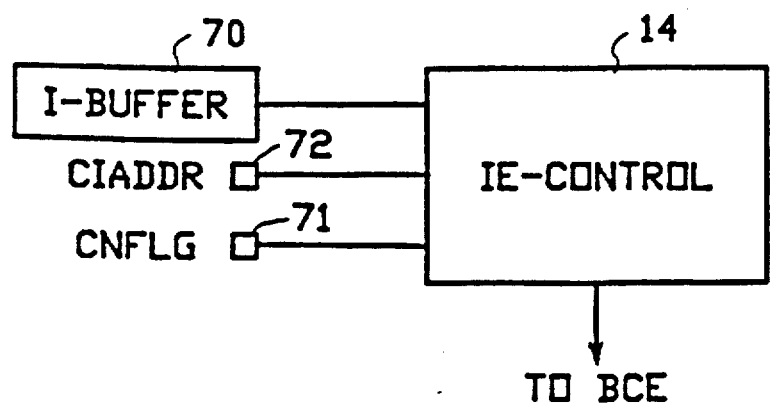
FIG. 2 shows the organization of the instruction control at the instruction execution unit for each processor.

FIG. 2 shows the background organization of the instruction control at the IE unit for each CP. The IE at each CP has the capability of executing instructions on conditional basis. Branch prediction may be employed, although not required. For the purposes of explanation herein, the present description has been simplified to assume that the only cause for conditional execution is due to fetching potentially dirty data on an XIEX event, although the control of conditional execution bears much resemblance to that for branch prediction machines. In particular, when an instruction is aborted, the IE unit can reset the machine status (registers) to the point before the instruction was started. There is an instruction buffer (IBUF) 70 containing 16 halfwords. Note that in the IBM 370 architecture each halfword (HW) is two bytes long and each instruction code can be of length between 1 to 3 halfwords.

In order to simplify the embodiment of the invention insequence serial execution only is assumed, although the concept of the invention does not preclude more complex implementations for out-of-sequence executions. Instructions are executed only according the logical sequence in the instruction stream, including the conditionally executed instructions. Operand fetches and stores are carried out only according to the logical sequence. The IE unit maintains a single flag register CNFLG 71 indicating whether the currently executed instruction is conditional. The IE also maintains a register CNIADDR 72. Under the conditional execution phase, with CNFLG=1, CNIADDR holds the address of the instruction that first initiated the conditional fetch of data from main storage.

Figure 3:
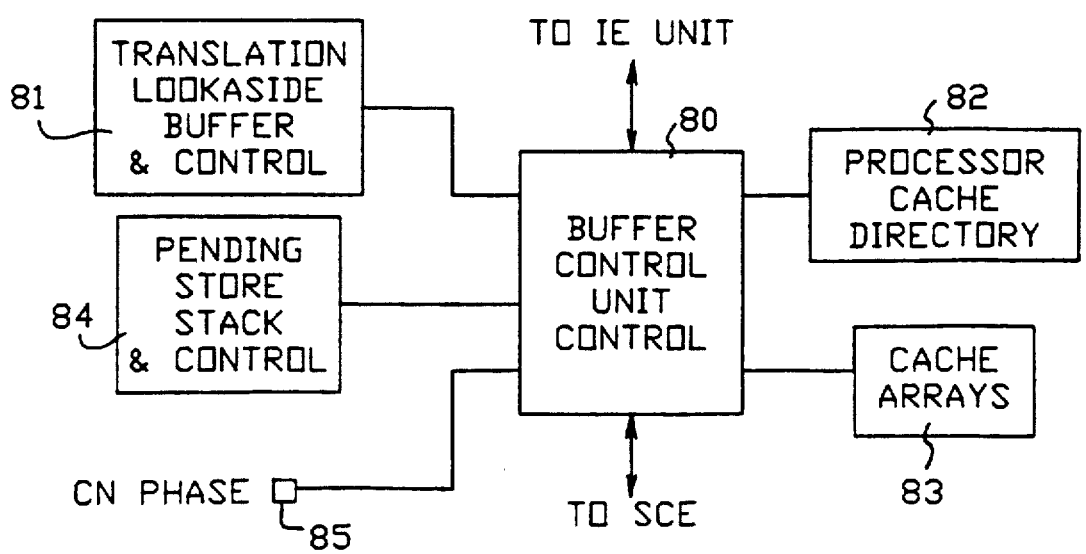
FIG. 3 shows the overall organization of a Buffer Control Element.

FIG. 3 shows the overall organization of a BCE, for example, 20. The BCE maintains, via BCE control 80, translation lookaside buffer (TLB) for the translation of logical main storage access addresses to real addresses, via TLB control 1. Processor Cache Directory (PD) 82 is the processor cache directory. Cache arrays 83 contain the actual cache data. The pending store stack (PSS) 84 has 8 entries. PSS 84 is used to hold DW stores from IE execution that have not yet been sent out to cache and main storage. The BCE control maintains a flag bit CNPHASE 85 indicating whether there is a potentially dirty cache line active at the moment.

Figure 4:
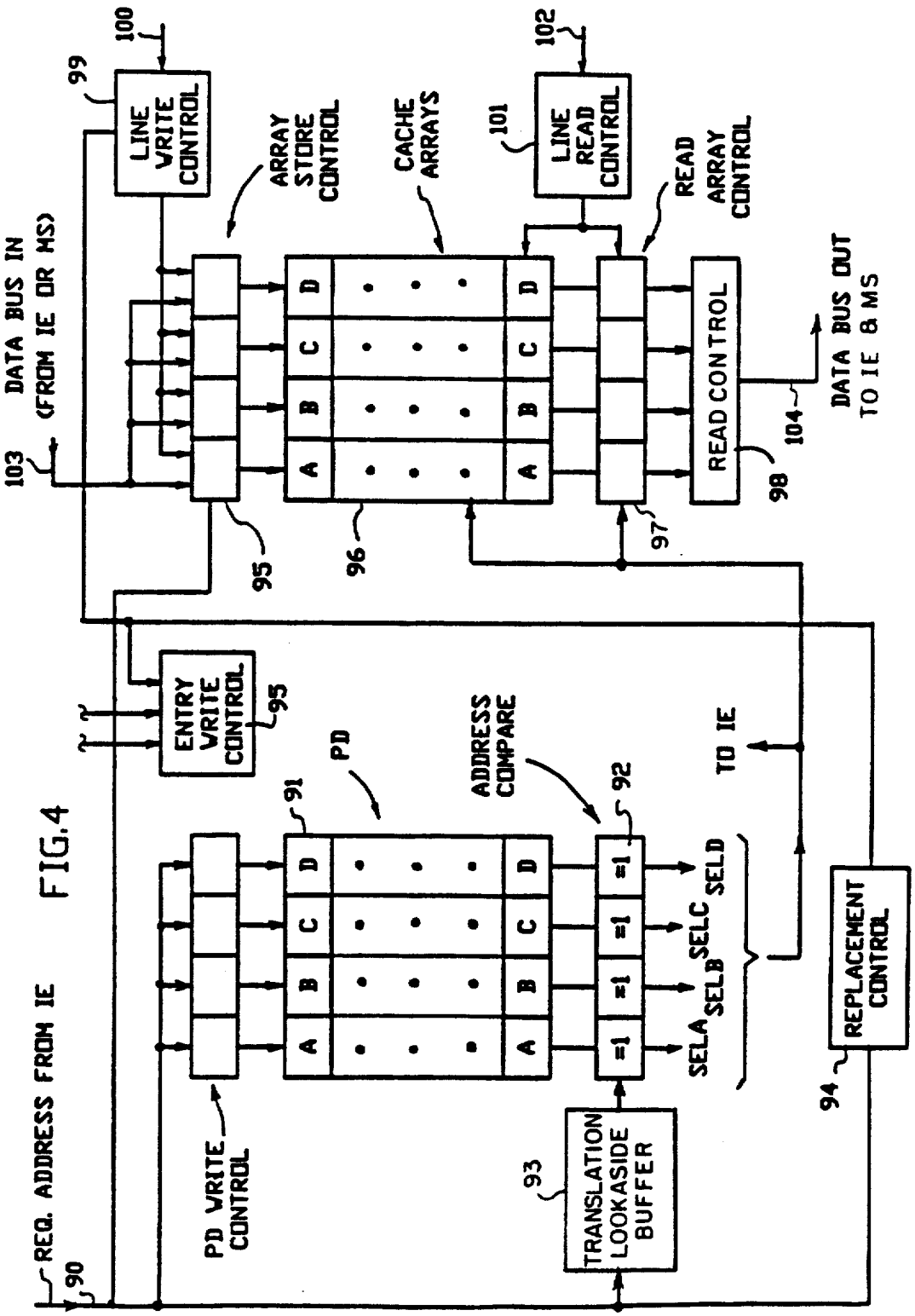
FIG. 4 shows the organization of a typical cache control.

FIG. 4 describes a typical cache control 80 within a BCE (20, for example), similar to the descriptions of U.S. Pat. No. 4,484,267. The fetch or store request address (logical or real) from the IE at 90 is used to select a congruence class from the processor cache directory (PD) 91. In the described 4-way set-associative cache design there are 4 directory entries A-D read out from the selected congruence class. The absolute line addresses recorded at these 4 PD entries A-D are compared at 92 with the absolute request address obtained from the address translation facility 93. These addresses are compared to determine whether the line is missing in the cache or which of the 4 lines this access hits, as indicated by the SELA, SELB, SELC, and SELD signals. The results of the address compares are passed to both the IE unit and the array control. The replacement control 94 maintains the replacement status arrays, updates these status arrays when necessary, and selects the line entry to be re placed when a new line is fetched from MS. The PD entry write control 95 controls the update of PD entries. For a DW fetch request, in parallel to the PD read and translation processes, 4 DWs A-D in the selected congruence class are read out of the array for late select 97 when the directory address compare 92 is done. As determined by control 98, a DW data is read out at 104 to either the IE unit or the MS as needed. As described in U.S. Pat. No. 4,394,731 a DW store from the IE is preceded with a store interrogate (SI) request during an earlier cycle. The SI request will make sure that the store can be done without a conflict such as a key violation, cache miss or absence of EX status. After the SI cycle the actual DW store may be issued by the IE with direct putaway into the correct array position. The arrays 96 are updated under the control of 99 and 95 either by line or doubleword granularity. The data for array store comes at 103 from either the IE or the main storage.

With the store-thru cache design a SI request should also make sure that it is possible to issue the DW store to MS or to hold it in the pending store stack (PSS). Otherwise the SI request will cause a hold of the store at the IE till the conflict gets cleared in a later cycle.

Figure 5A:
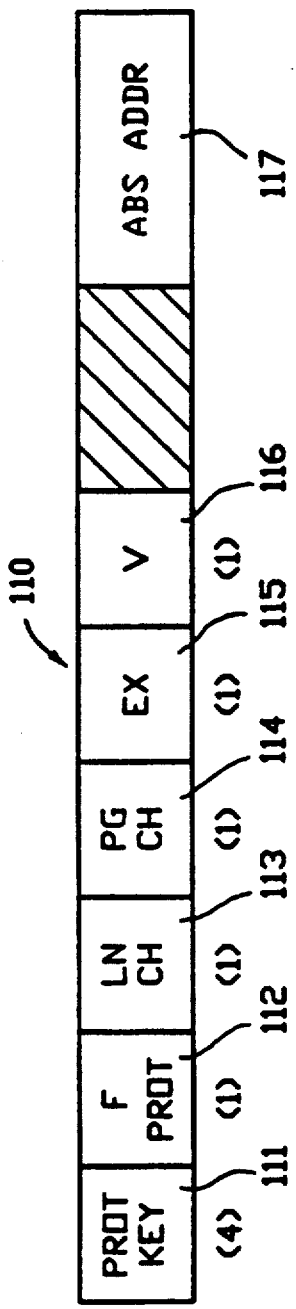
FIGS. 5A, 5B and 5C show the formats for processor cache directory and copy directory entries, respectively.
Figure 5B:
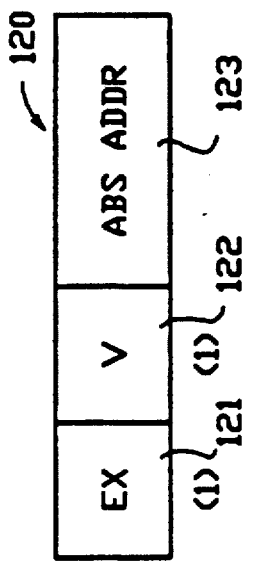

FIGS. 5A and 5B provide the formats for PD (110) and CD (120) entries respectively, similar to that described in U.S. Pat. No. 4,394,731. V (116,122) is the valid bit for the directory entry. A valid line is in exclusive (EX) state if the associated EX bit (115,121) is 1, and is in read only (RO) state otherwise.

Each PD line entry additionally contains a protect key (PROT KEY), a line change (LC CH) bit, a fetch protect (F PROT) bit and a page change (PG CH) bit.

Figure 5C:
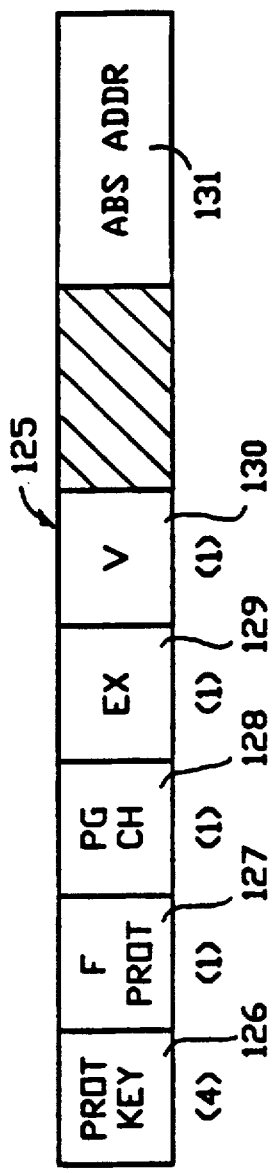

A CD at the SCE is maintained as a mirror image for the PD at the corresponding BCE the same way as described in U.S. Pat. No. 4,394,731. The contents (EX, V and ABS ADDR 117 and 123) of a CD entry should be identical to those at the corresponding PD entry except during a transition phase for a status change. Note that, since with our ST cache design all CP stores to cache will be reflected at the MS, there is no need for the LN/CH (line changed) field (113) at the PD entry which indicates whether the cache line is holding data not scheduled to be sent to MS. FIG. 5C contains the modified format (125) for a PD entry.

With ST design the castout command from BCE to SCE is eliminated. A castout for SIC design, as described in U.S. Pat. No. 4,394,731, causes a changed line in a SIC to be updated at the main storage through SCE 30. With ST design the castout command is replaced with a DW store command, with which the BCE sends a DW store request to SCE 30 for the up date of main storage upon an IE store. When a store request is made by the BCE to SCE, the DW data for the store will be sent down via the data bus in parallel. The SCE should coordinate with each BCE such that a store request from the BCE will always be received in the associated store stack (SS) at the SCE in normal conditions. The cross-interrogate (XI) handling at the SCE by examining the CDs is similar to that in U.S. Pat. No. 4,394,731. In the present invention a cache miss is allowed to fetch a line from main storage before the clearing procedure is complete in the XIEX situation. The reply signal from SCE to BCE is enhanced with an additional cleared (CLR) bit. When the CLR bit is 0 the BCE treats this newly fetched line as potentially dirty and subject to possible abortion if used. Otherwise the fetched line is regarded valid as usual.

The IE may issue fetch or SI request with EX intent also as described in U.S. Pat. No. 4,394,731. Such a request can be successfully handled only when the requested DW hits to a cache line with EX bit on. A fetch request with RO intent only requires the line valid in the cache with V bit on. Protection errors and other exceptions in cache access will be handled by special exception logic.

Figure 6A:
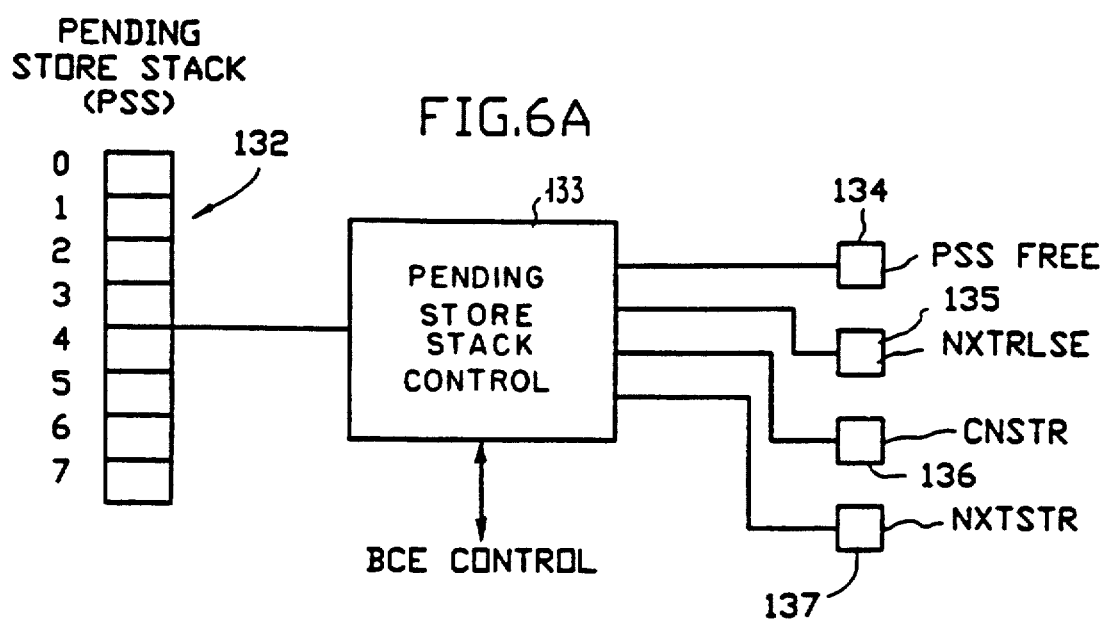
FIG. 6A shows the structure of the Pending Store Stack.
Figure 6B:
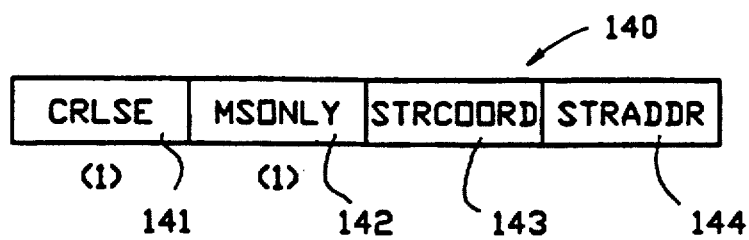
FIG. 6B shows the formats of a pending store stack directory entry.

The pending store stack (PSS) 132 at a BCE (for example, 20) is described in FIG. 6A. PSS 132 is implemented as a circular FIFO queue with 8 entries, labelled 0 through 7. Each PSS entry contains DW data for a store issued from IE. FIG. 6B shows the format of a PSS directory entry 140, including their sizes in bits. At each PSS directory entry there are at least three fields: absolute DW address field STRADDR (28 bits) 144, two flag bits CRLSE (1 bit) 141 and MSONLY (1 bit) 142, and a field STRCOORD 143 recording the cache position for the stored DW. When CRLSE 141 bit is on the DW store is under conditional phase and cannot be released to main storage. When MSONLY 142 bit is on for a PSS entry, the store has already been put away to the cache but not yet sent to the main storage. The BCE maintains 3 index registers NXTRLSE 135, CNSTR 136 and NXTSTR 137 for PSS management, and each holds an integer value between 0-7. Initially all of the three registers are reset to 0. NXTRLSE 135 indicates the PSS entry holding the first store, and NXTSTR 137 points to the next entry to insert the next store. CNSTR 136 points to the PSS entry holding the first conditional store, if CNPHASE=1. BCE 20 also maintains a counter register PSSFREE 134 to indicate the number of free entries left, which is initially 8. The BCE constantly looks for the first DW in PSS for store putaway, if PSS is not empty at the moment. All the stores in PSS are putaway to cache and main storage in incoming sequence.

In order to simplify the description of the present invention each BCE is required to not allow more than one outstanding request to be issued to the SCE at any moment, except store releases from PSS to the main storage for finished or unconditionally executed instructions. The following descriptions will also ignore handling for exception conditions.

Figure 7A:
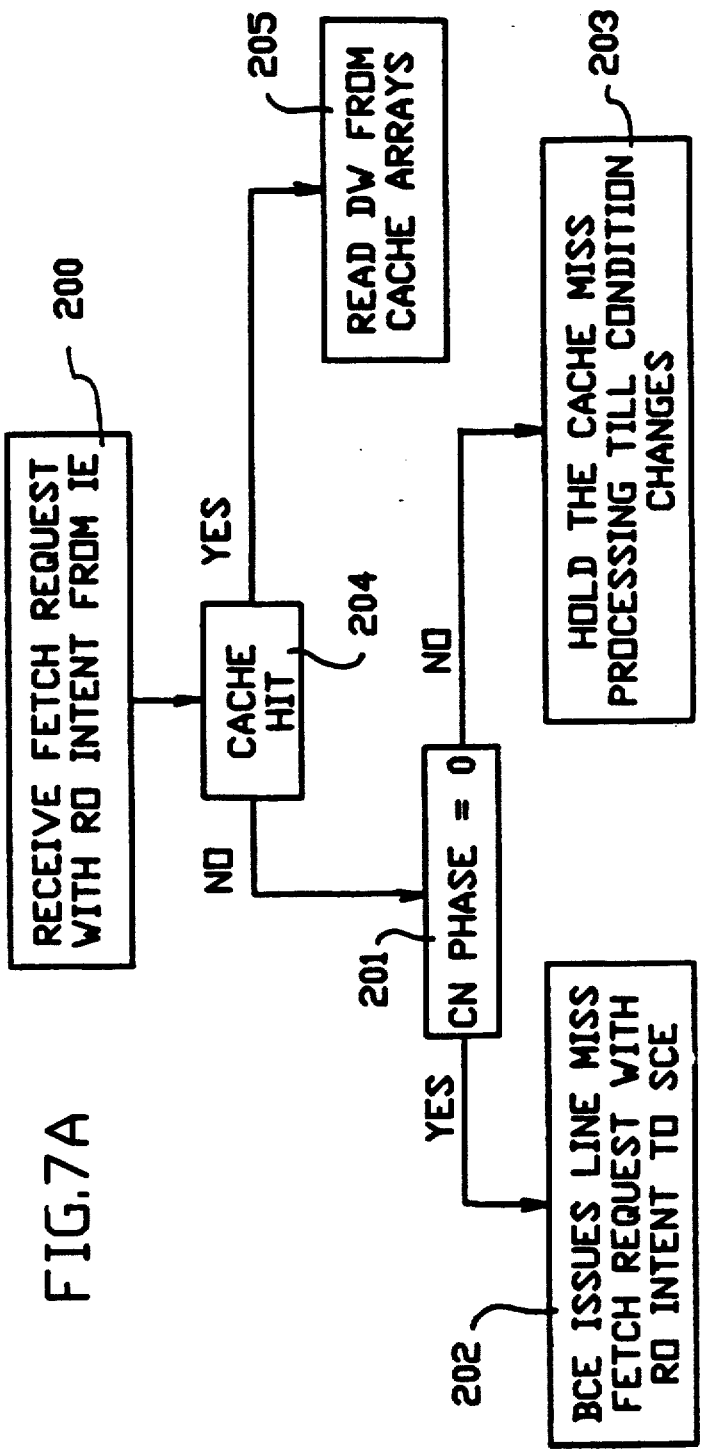
FIGS. 7A, 7B, 7C and 7D are flowcharts useful in explaining the operation of the present invention.

FIG. 7A is a flowchart showing BCE handling upon receiving a fetch request (200) with RO intent from the IE unit. For a cache miss (204) the BCE will issue a miss fetch request with RO intent to the SCE (step 202) if CNPHASE=0 (step 201) at the BCE. Otherwise, if CNPHASE=1 (201), the miss fetch will be held till CNPHASE is cleared later (step 203). The IE idles and waits for the missed DW to arrive from MS. Upon a cache hit (step 204) the DW is accessed from cache without delay if it does not conflict with any of the possibly existing DW stores in the PSS (step 205). The detection of such conflict is through operand store compare, which matches the requested fetch DW address against all valid DW address in the PSS that have the MSONLY bits turned off. A conflict is detected if a match is found, in which case the fetch will be reissued later till the conflict condition disappears.

Figure 7B:
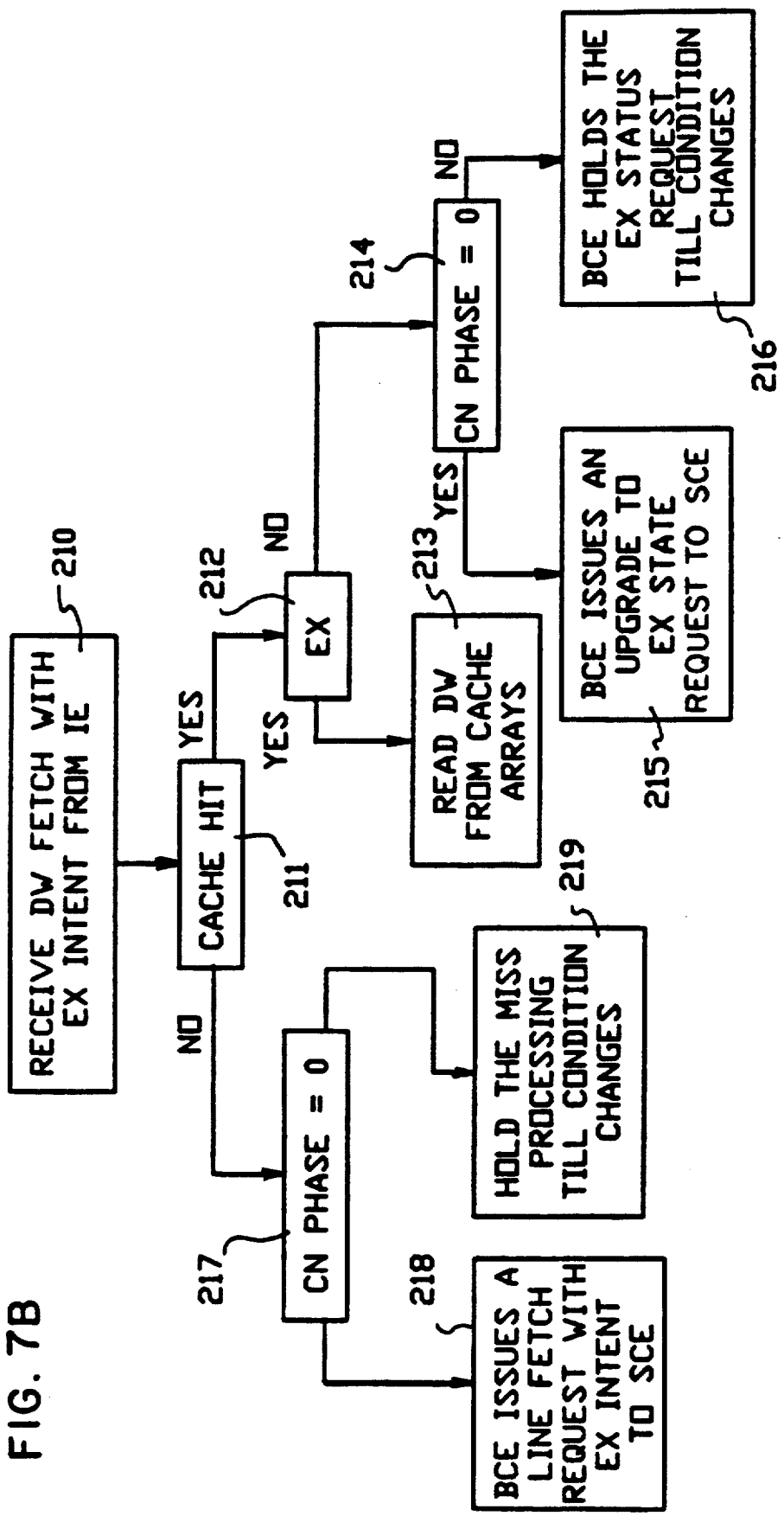

FIG. 7B contains a flowchart for BCE handling upon receiving a fetch request with EX intent from the IE unit (step 210). The fetch is carried out (step 213) without delay if the line is resident in cache (step 211) with EX state (step 212). If the DW hits to a RO line in cache (step 214) the BCE issues a request for EX status to the SCE (step 215) when possible. If the line misses in cache (step 211) the BCE issues a miss fetch request with EX intent to the SCE (step 218) when possible. Such SCE requests are held if conditional execution is in effect (steps 216 and 219).

Figure 7C:
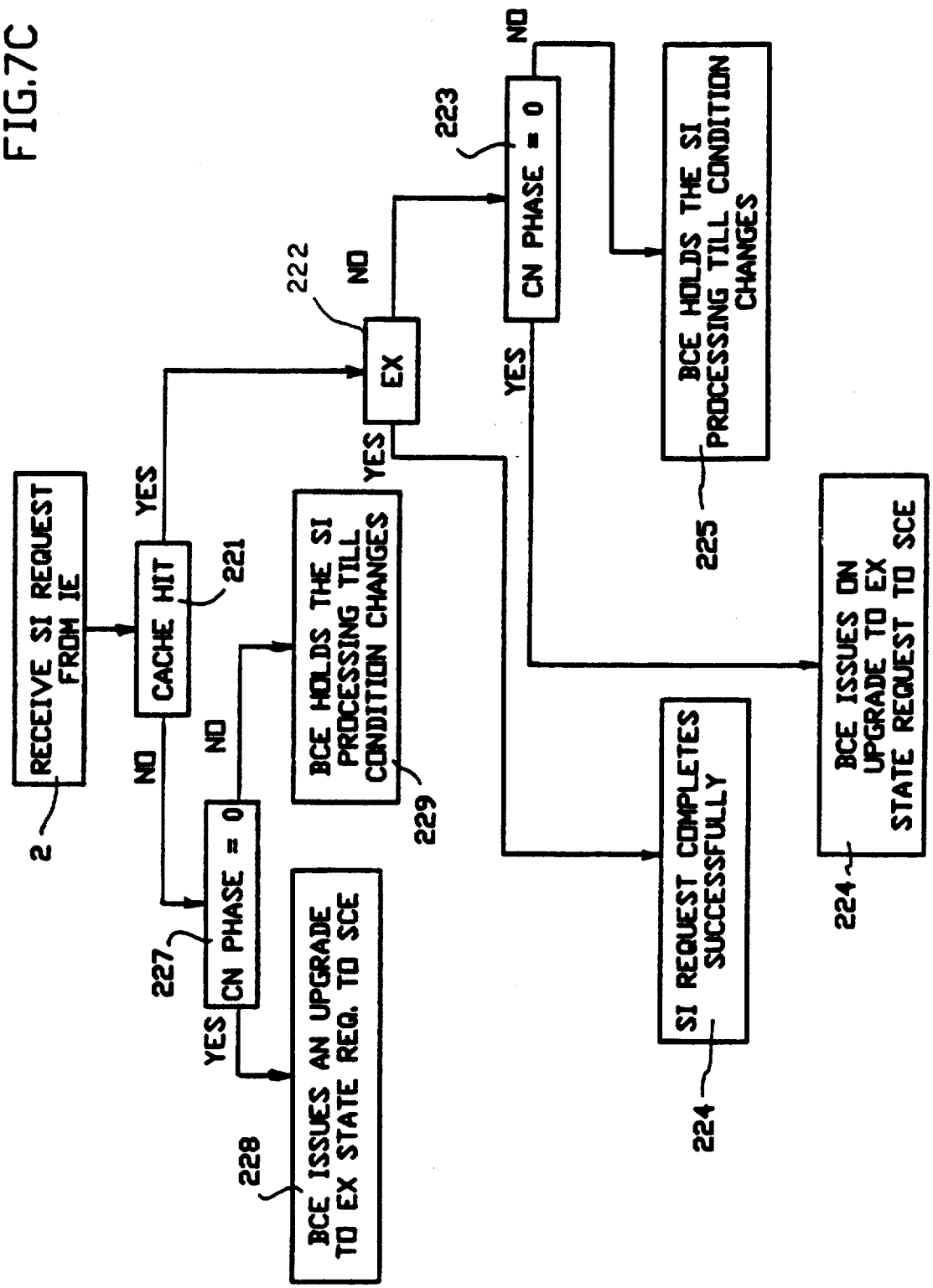

FIG. 7C contains a flowchart for BCE handling upon receiving a store interrogate (SI) request with EX intent from the IE unit (step 220). The operation of BCE is similar to those described in FIG. 7B, except that no DW fetch to IE is needed. The BCE records the cache coordinate found for the DW in anticipation of oncoming store from IE. The fetch is carried out (step 226) without delay if the line is resident in cache (step 221) with EX state (step 222). If the DW hits to a RO line in cache (step 223) the BCE issues a request for EX status to the SCE (step 224) when possible. If the line misses in cache (step 221) the BCE issues a miss fetch request with EX intent to the SCE (step 228) when possible. Such SCE requests are held if conditional execution is in effect (steps 225 and 229).

Figure 7D:
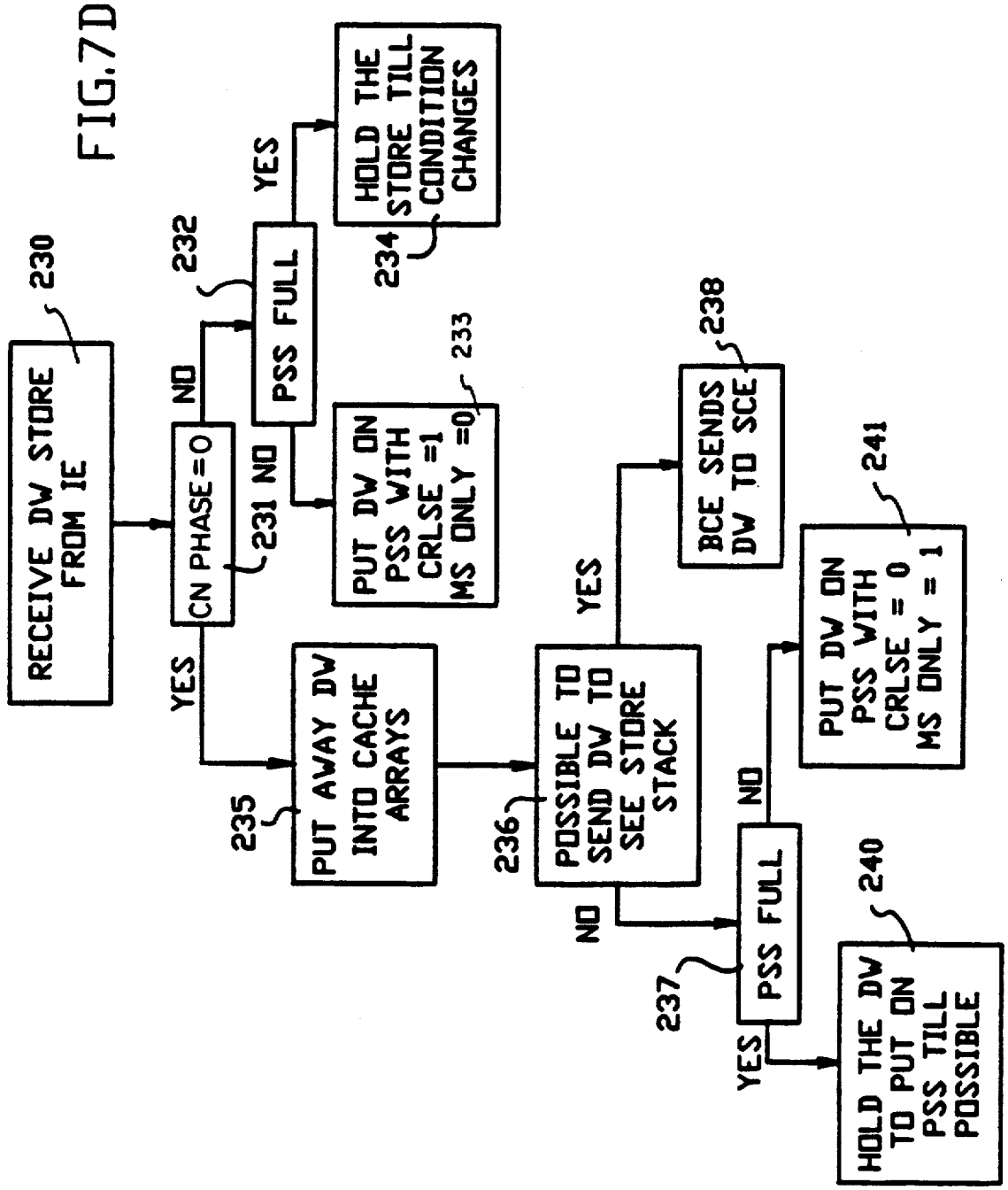

FIG. 7D contains a flowchart for BCE handling upon receiving a store request from the IE unit (step 230). For a conditional execution, when CNPHASE=1 (step 231), the DW store is put on PSS if possible (steps 232 and 233). In case PSS is full (step 234) the store will be held till PSS has room available. In any case, when a store request is put on PSS for conditional execution, the store is not put away into the cache array, and the MSONLY flag is set to 0 at the associated PSS entry in order to necessitate the cache store put away when the store is released later on (step 233). For a store request with CNPHASE=0 (step 231) the BCE will try to put away the DW into cache (step 235) and send to MS immediately if possible (steps 236 and 238). The store is put away into cache if there is no other outstanding stores left in PSS at the moment (steps 237, 241). If for any reason the BCE cannot complete putaway to cache or sending store to MS the BCE will put the store request on PSS if there is room there. In case the DW is putaway into cache and the request is queued on PSS due to MS store stack full condition, the MSONLY bit will be set to 1 at the PSS entry in order to avoid repeated cache store later.

When the SCE receives a DW store request from CPi the request is simply queued onto the store stack SSi at the SCE. The SCE will constantly update DW stores from the store stacks to main storage when possible.

Figure 8B:
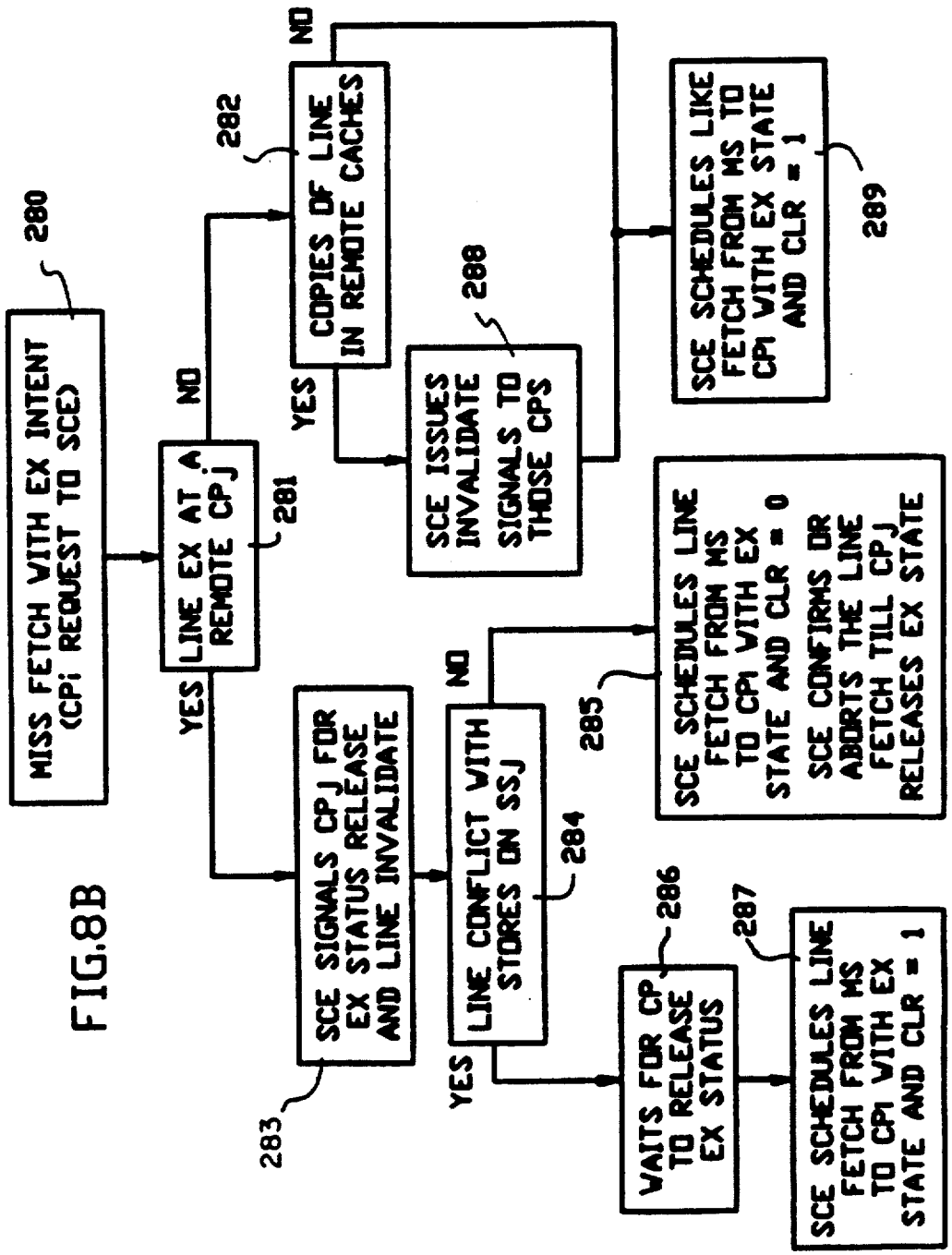
Figure 8C:
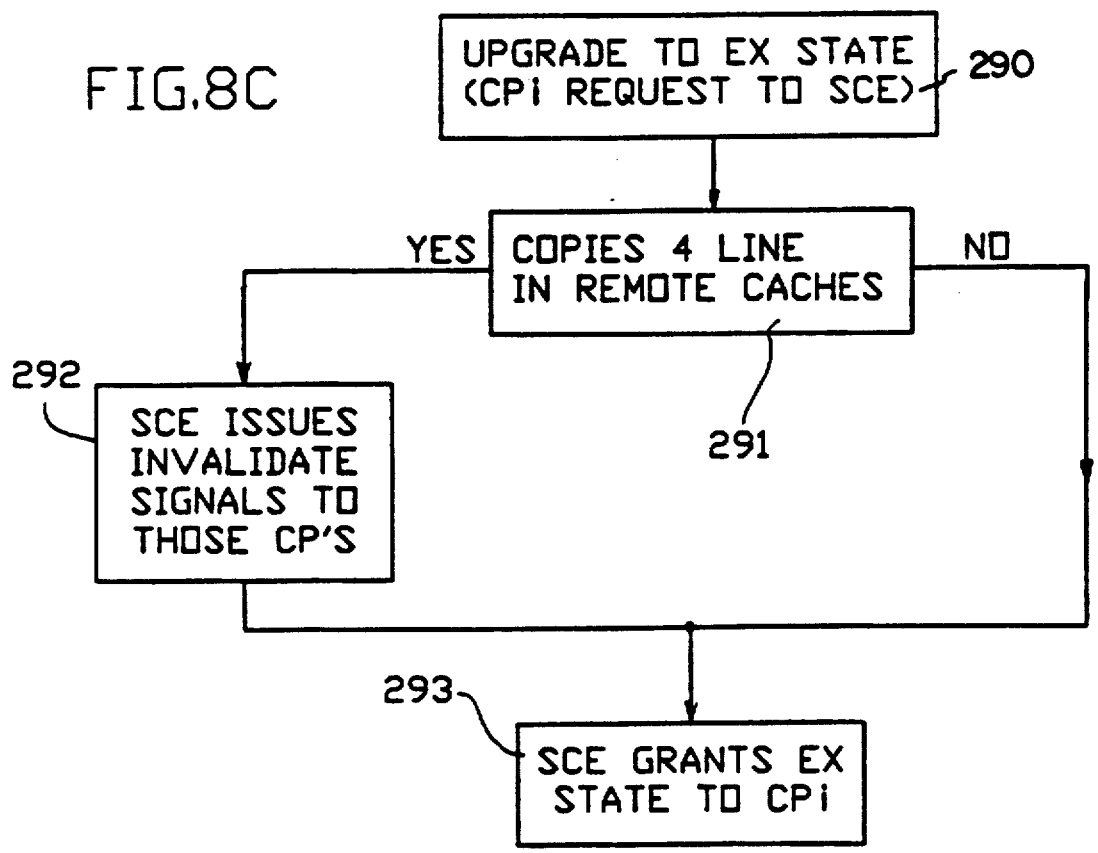

The SCE may receive three major requests from a BCE. A miss fetch with RO intent requests a cache line transfer from main storage with RO state. A miss fetch with EX intent requests a line transfer from main storage with EX status. The third request type is Upgrade to EX status which requests only the EX status for a cache line that is already resident at the BCE with RO state. A request from BCE may trigger crossinterrogate (XI) actions. The SCE handles XIs in a manner similar to but differently from the scheme described in U.S. Pat. No. 4,394,731. The maintenance of CDs and the searching of them in determining XI condition are similar, but different algorithms are used in resolving XIs. In the following the SCE handling of BCE requests will be described in terms of a request from BCE of CPi, where $0 \leq i \leq 3$. FIGS. 8A-C are flowcharts describing the SCE handling for the three requests from BCEs.

FIG. 8A contains the flowchart for SCE handling of a line miss request from CPi with RO intent (step 270). If the line is not held EX remotely (271), the SCE schedules a line fetch from main storage to CPi and signals CPi with a receive line signal with CLR bit on (step 272). Now assume that CPj ($j \neq i$) is holding the line EX. The SCE sends out change EX to RO (CERO) signal to CPj (step 273). Then the SCE checks whether the line overlaps with any outstanding DW in the store stack SSj (step 274). If not, the SCE schedules a conditional fetch of the line from main storage to CPi with RO state assigned, and the BCE of CPi is notified with a receive line signal with the CLR bit off. At this point the SCE recognizes that CPj is still assuming EX state on the line, and it anticipates CPj to acknowledge the release of EX status in some later cycle (step 275). On the other hand, if the SCE detects that the line already conflicts with a store in SSj at the moment, it will schedule the unconditional line fetch (CLR=1) from main storage to CPj only after the release EX status signal is received from CPj (step 276) and when all conflicting stores in SSj have been sent out to main storage. As a general rule, the SCE does not schedule a main storage line fetch (step 277) until conflicting stores in store stacks are cleared. The reason for not scheduling conditional main storage line fetch when the SCE detects outstanding store conflicts is that CPj is more likely to generate more stores in this case.

FIG. 8B shows the SCE operations for a line fetch request with EX intent from CPi (step 280). It is similar to the procedures described in FIG. 8A, except that the SCE needs to send invalidate line signal to all CPs that holds a copy of the line as indicated in the CDs.

If the line is not held EX remotely (281), it is checked to determine if the line exists in the remote cache (step 282) and if so the remote BCEs are signalled to invalidate the line (step 288). After this, or if the line does not exist in the remote cache (step 282) then the SCE schedules a line fetch from main storage to CPi and signals CPi with a receive line signal with CLR bit on (step 289). If CPj (j=i) is holding the line EX, the SCE signals CPj to invalidate the line (step 283). Then the SCE checks whether the line overlaps with any outstanding DW in the store stack SSj (step 284). If not, the SCE schedules a conditional fetch of the line from main storage to CPi with RO state assigned, and the BCE of CPi is notified with a receive line signal with the CLR bit off. At this point the SCE recognizes that CPj is still assuming EX state on the line, and it anticipates CPj to acknowledge the release of EX status in some later cycle (step 285). On the other hand, if the SCE detects that the line already conflicts with a store in SSj at the moment, it will schedule the unconditional line fetch (CLR=1) from main storage to CPj only after the release EX status signal is received from CPj (step 286) and when all conflicting stores in SSj have been sent out to main storage.

As a general rule, the SCE does not schedule a main storage line fetch (step 287) until conflicting stores in store stacks are cleared. The reason for not scheduling conditional main storage line fetch when the SCE detects outstanding store conflicts is that CPj is more likely to generate more stores in this case.

FIG. 8C describes the SCE operations for an upgrade to EX request from from CPi (step 290). In this case the line is already valid and RO at the BCE of CPi. If it determines that the line is held in remote caches (step 291) the SCE only needs to send out invalidate signals to those BCEs that contain copies of the line (step 292). The design should make sure that all the invalidate signal recipients get the signals not after CPi receives the signal for upgrading RO state to EX (step 293). The timing control depends on the specific implementation environment.

In FIGS. 8A and 8B a conditional line fetch from main storage to CPi may be scheduled before the SCE finalizes the release of EX state of the line held by CPj (j≠i). It is possible that the SCE receives from CPj subsequent stores on the line before an acknowledgement on the release of EX status. In this situation the SCE should notify CPi to abort the conditionally fetched data through a regular line invalidate signal. On the other hand, if the SCE receives from CPj the acknowledgement of releasing EX state without generating extra stores to the line, the SCE may then finalize the state change and sends a confirm status signal to CPi. After CPi receives the confirm status signal, the BCE will discard the conditional status of the line as will be described later.

Note that the SCE will not finalize the release of EX state of a line by a CP until it is sure that the relevant stores in the associated store stack SS are cleared into main storage. This is not a necessary requirement in general. The assumption is made in this description in order to simplify the description of the design. Also it is assumed that the SCE serializes the handling of XIs properly. The SCE will not issue an XI request on a line to a CP before the SCE has completed the handling of an earlier request from the CP itself.

The BCE of a CP may receive the following four major signals from the SCE: receive line, confirm status, CERO, and line invalidate. FIGS. 9A–D are flowcharts for the BCE actions upon receiving these signals.

Figure 9A:
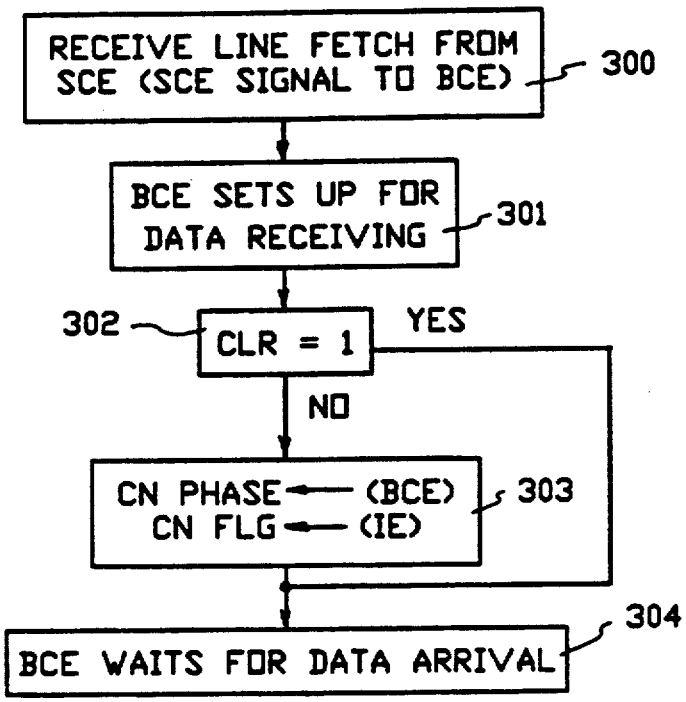

FIG. 9A shows the BCE action for a receive line signal from SCE (step 300). The BCE gets ready to receive data from main storage later on (step 301). If the CLR bit is 1 in the signal (step 302), indicating an unconditional fetch, the BCE waits for the arrival for data as usual (step 304). If the CLR bit is 0 (step 302), indicating a conditional transfer, the BCE will start the conditional execution phase as described with respect to FIG. 10 (step 303).

Figure 9B:
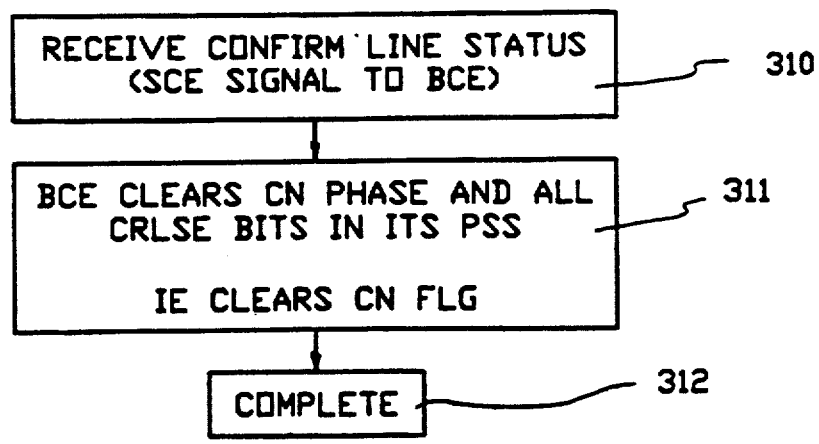

FIG. 9B describes the BCE actions upon receiving a confirm status signal from the SCE (step 310). In this situation there should already be a conditionally fetched line outstanding. The BCE resets the conditional execution phase by turning off its CNPHASE flag and by resetting all the CRLSE bits to 0 in the PSS directory. The BCE also signals the IE unit to reset its CNFLG register to 0 (step 311).

Figure 9C:
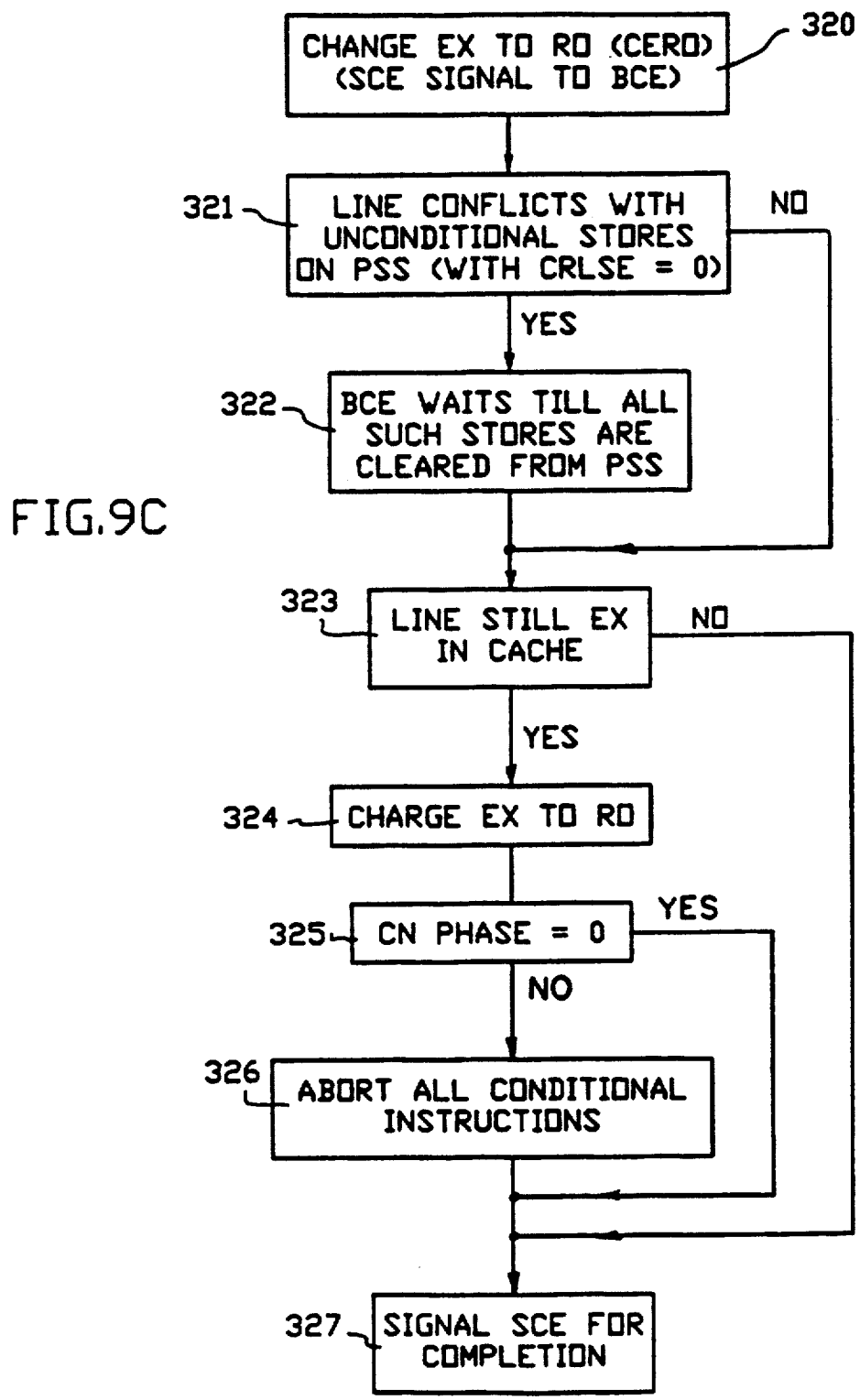

FIG. 9C describes the BCE actions upon receiving a CERO request from the SCE (step 320). The BCE checks whether there is any pending store from previous unconditional execution still not yet released to SCE (step 321). The BCE verifies this by examining the PSS (matching with pending stores having CNSTR=0) and by determining whether there is an ongoing but unfinished store release to SCE and the cache (step 322). When the conflict condition no longer exists the BCE changes the EX state of the line to RO (step 324) if located at the cache directory (step 323) and signals the SCE for completion of CERO operation (327). If the conditional execution phase is up, as indicated by CNPHASE=1 at the BCE (step 325), and if the EX status of the line did exist at the cache (step 323), the BCE will trigger the abortion of all unconditional instructions (step 326).

FIG. 9D shows the BCE actions upon receiving a line invalidate request from the SCE (330). The operation is similar to that for the handling of a CERO request.

The BCE checks whether there is any pending store from previous unconditional execution still not yet released to SCE (step 332) if the line is found in the cache (step 331). The BCE verifies this by examining the PSS (matching with pending stores having CRLSE=0) and by determining whether there is an ongoing but unfinished store release to SCE and the cache (step 333). Thereafter, at step 334 the line is invalidated. If the conditional execution phase is up, as indicated by CNPHASE=1 at the BCE (step 335), the BCE will trigger the abortion of all conditional instructions (step 336). It is not necessary, however, to abort possibly existing conditional executions if the line is already absent from the cache. The BCE needs not signal the SCE for completion unless the line is EX in the cache (337).

Figure 10:
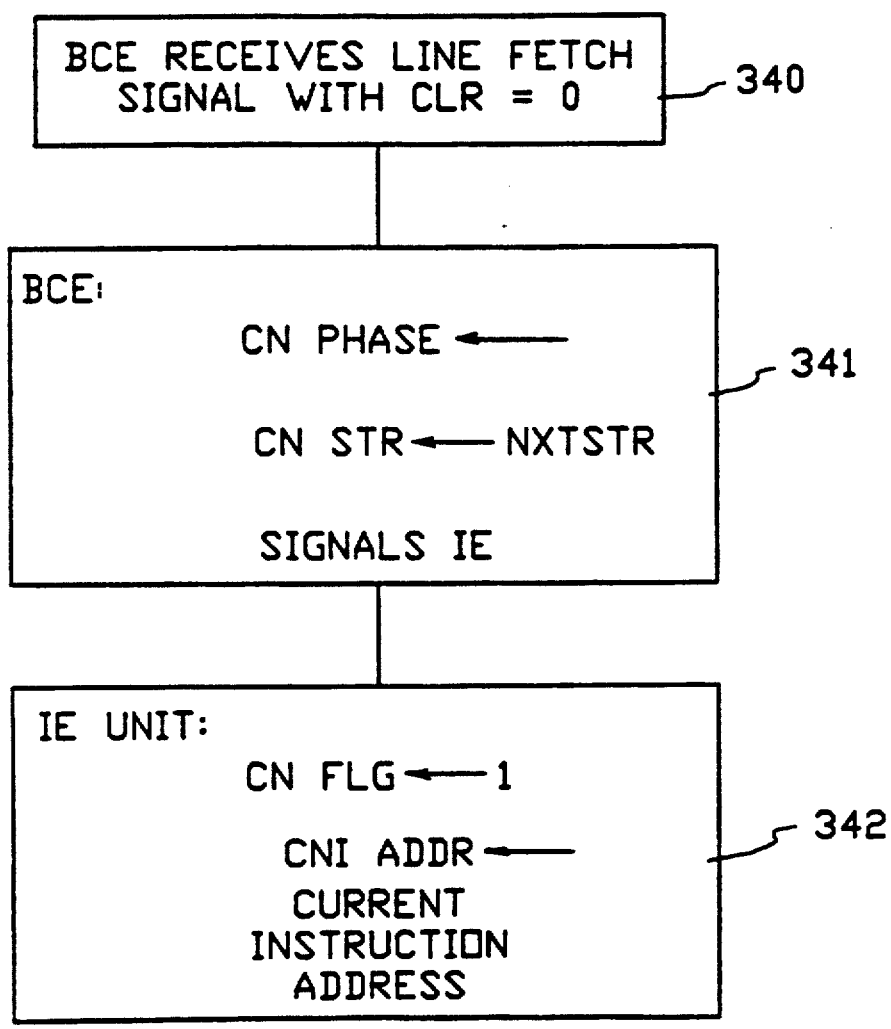
FIG. 10 is a flowchart useful in explaining the operation of the present invention.

FIG. 10 describes the actions of BCE and IE for starting the conditional execution phase. As soon as the BCE receives a line fetch signal with CLR bit on from the SCE (step 340), the BCE sets CNPHASE to 1 and assigns the value of the NXTSTR index register to the CNSTR register for PSS management. The BCE also signals the IE unit to start conditional execution (step 341). The IE unit recognizes conditional execution phase via CNFLG=1. When the CNFLG is first turned on the IE unit records the instruction address in the register CNIADDR (step 342).

During the conditional execution phase, any store queued on PSS will cause the CRLSE and MSONLY bits turned off, the NXTSTR register incremented by 1 (modulo 8), and PSSFREE decremented by 1. Also, the position of the cache line, as identified by the preceding SI command, will be recorded at the STRCOORD field at the new PSS entry. PSS overflow condition for PSS insertion is detected when PSSFREE=0, in which case the store will be held by the IE. During unconditional execution phase, a store may also be pushed on PSS when the store stack at the SCE is full, although the DW is putaway into the cache. In this situation, at the PSS entry, the MSONLY bit is turned on and the CRLSE bit is also on.

Figure 11:
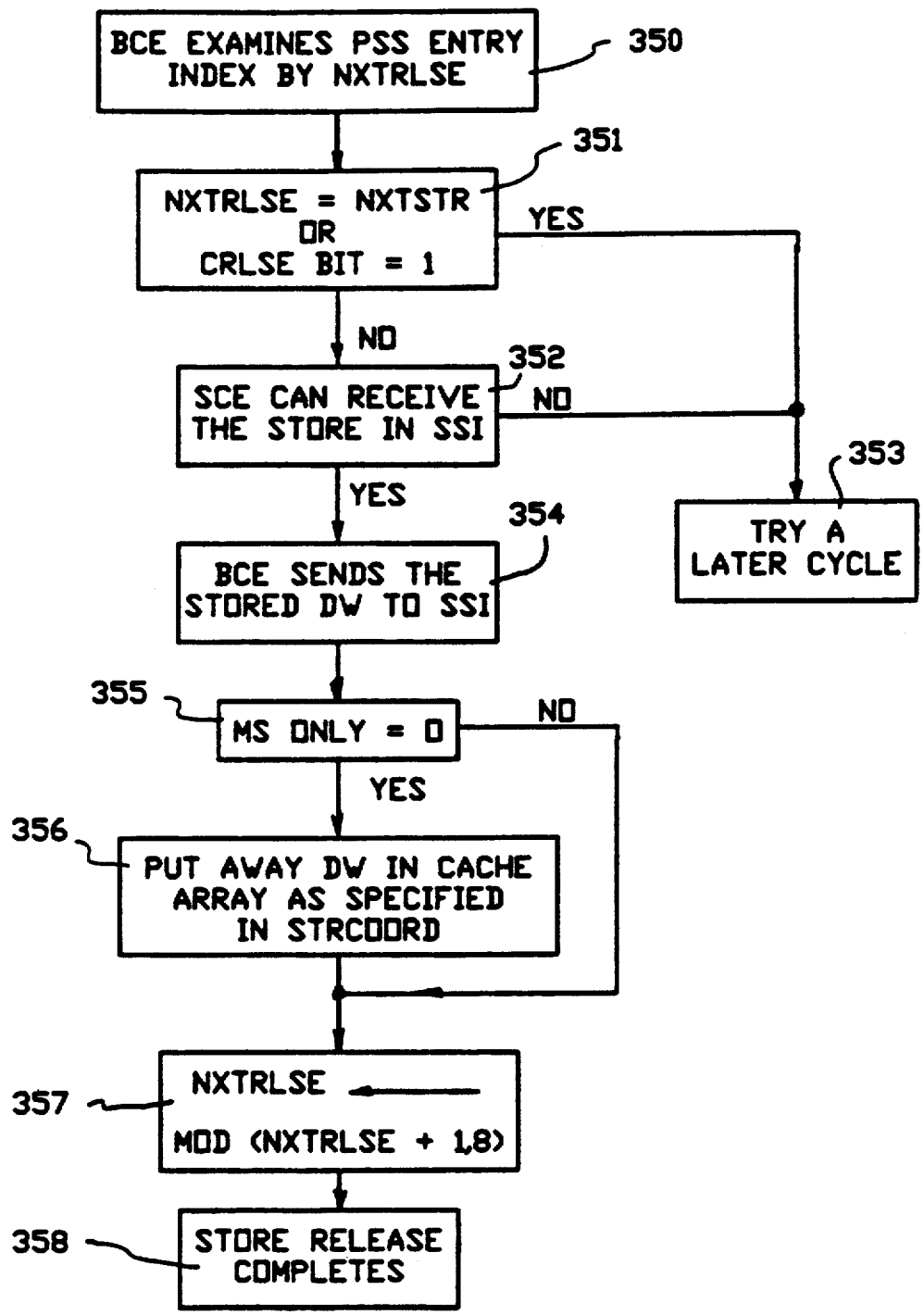
FIG. 11 is a flowchart useful in explaining the operation of the present invention.

FIG. 11 describes BCE operations at CPi for locating the next store to release from PSS. The BCE constantly examines the PSS for next pending store to release to SCE. The next store in PSS is indexed by the NXTRLSE register (step 350). The next store on PSS cannot be released if NXTRLSE is equal to NXTSTR (indicating empty PSS) or if the CRLSE bit is on (indicating conditional store) (step 351). When a store is released from the PSS the BCE increments the register NXTRLSE by 1 (modulo 8) (step 357) and increments PSSFREE by 1. When the released PSS store entry has the MSONLY bit off (step 355) the DW is also putaway into the cache positioned by the STRCOORD field at the PSS directory entry (step 356).

Abortion of conditional executions is triggered by the BCE and is also handled by the IE unit. The BCE resets the CNPHASE flag to 0 and clears all the conditional stores at the PSS by resetting NXTSTR register with the value of CNSTR register and by adjusting PSSFREE. When the IE unit is signaled for abortion, it turns the CNFLG off and restarts the execution of the instruction recorded by the CNIIDX address register.

Restarting execution involves resetting machine state properly, according to the particular implementation. One simple technique is for the IE to copy the machine state like PSW and GPRs before the conditional execution. Depending upon particular implementations, it is beneficial to hold or abort conditional execution when the complexity of backing up instruction execution or system recovery become undesirable. For instance, the design may forbid conditional executions for serialization instructions like Compare-and-Swap (CS). In the extreme case, the design may not carry out any conditional execution, but simply allows early fetching of cache lines upon XIEX situations. Although the invention has been described in terms of MP cache design with RO and EX states, similar concept and techniques may be applied to store-thru MP caches without EX/RO states to allow early fetching of data lines.

While the invention has been described in its preferred embodiments, it is to be understood that changes in form and details of the above description may be made without departing from the true scope and spirit of the invention.

I claim:

1. In a multiprocessor computer system having:
   a plurality of processors,
   a local cache for each of said processors,
   a main storage shared among said processors, and
   a concurrency control scheme in which each line in said main storage may have one of at least two alternative states,
   said first alternative state for a line permitting any processor to read from but not to write to said line, and
   said second alternative state for a line being held by a particular processor and permitting only said particular processor to read from and to write to said line,
   an improved method for fetching a line from said main storage into said local cache of one of said processors when another one of said processors holds said line in said second state,
   said improved method comprising the steps performed by a multiprocessor computer system of:
   requesting that the state of said line be changed to a state which allows said one processor to read from said line;
   without waiting for said requested change in state to be made, provisionally fetching to the local cache of said one processor said line still held in said second state by said another processor;
   confirming to said one processor upon making said requested change in state whether said line was modified after it was provisionally fetched; and
   in the event said line was modified after it was provisionally fetched, refetching said modified line, whereby processing delays are reduced.

2. The improved method defined in claim 1 wherein the step of requesting that the state of said line be changed comprises the step of requesting that the state of said line be changed to said first alternative state.

3. The improved method defined in claim 1 wherein the step of requesting that the state of said line be changed comprises the step of requesting that the state of said line be changed from said second alternative state held by said another processor to said second alternative state held instead by said one processor.

4. In a multiprocessor computer system having:
   a plurality of processors,
   a local cache for each of said processors,
   a main storage shared among said processors, and
   a concurrency control scheme in which each line in said main storage may have one of at least two alternative states,
   said first alternative state for a line permitting any processor to read from but not to write to said line, and
   said second alternative state for a line being held by a particular processor and permitting only said particular processor to read from and to write to said line, an improved method for fetching a line from said main storage into said local cache of one of said processors when another one of said processors holds said line in said second state, said improved method comprising the steps performed by a multiprocessor computer system of:

requesting that the state of said line be changed to a state which allows said one processor to read from said line;

without waiting for said requested change in state to be made, provisionally fetching to the local cache of said one processor said line still held in said second state by said another processor;

without waiting for said requested change in state to be made, reading from said provisionally fetched line by said one processor and provisionally continuing execution of instructions by said one processor; confirming to said one processor upon making said requested change in state whether said line was modified after it was provisionally fetched; and in the event said line was modified after it was provisionally fetched, refetching said modified line and redoing said provisionally executed instructions, whereby processing delays are reduced.

5. The improved method defined in claim 4 wherein the step of requesting that the state of said line be changed comprises the step of requesting that the state of said line be changed to said first alternative state.

6. The improved method defined in claim 4 wherein the step of requesting that the state of said line be changed comprises the step of requesting that the state of said line be changed from said second alternative state held by said another processor to said second alternative state held instead by said one processor.

7. The improved method defined in claim 4 wherein said redoing of provisionally executed instructions includes re-execution of any instruction which used data from said modified line or from any line in said local cache of said one processor which became invalid while awaiting said requested change in state and any instruction which depends upon any said re-executed instruction.

* * * * *